(12) United States Patent
Warmuth et al.

(10) Patent No.: US 8,976,534 B2
(45) Date of Patent: Mar. 10, 2015

(54) ARRANGEMENT FOR CONNECTING ELECTRICAL CONDUCTORS TO TERMINAL CONNECTIONS OF INTERCONNECTED CELLS

(75) Inventors: Frank Warmuth, Borkheide (DE); Thomas Schmiedel, Zehdenick (DE); Andre Schmidt, Zehdenick (DE); Ronny Warsinke, Zehdenick (DE)

(73) Assignee: Zehdenick Innovative Metall-und Kunststofftechnik GmbH, Zehdenick (DE)

( * ) Notice: Subject to any disclaimer, the term of this patent is extended or adjusted under 35 U.S.C. 154(b) by 394 days.

(21) Appl. No.: 13/386,733
(22) PCT Filed: Jul. 7, 2010
(86) PCT No.: PCT/EP2010/004139
§ 371 (c)(1), (2), (4) Date: Feb. 1, 2012
(87) PCT Pub. No.: WO2011/012215
PCT Pub. Date: Feb. 3, 2011

(65) Prior Publication Data
US 2012/0127676 A1 May 24, 2012

(30) Foreign Application Priority Data

Jul. 25, 2009 (DE) .......................... 10 2009 034 786
Sep. 16, 2009 (DE) .......................... 10 2009 041 738

(51) Int. Cl.
  *H05K 7/00* (2006.01)
  *H01M 2/20* (2006.01)
(52) U.S. Cl.
  CPC ................ *H01M 2/20* (2013.01); *H01M 2/202* (2013.01)
  USPC ............. 361/748; 361/807; 439/61; 439/152; 439/158; 439/160; 439/500; 439/507
(58) Field of Classification Search
  CPC ..... H01M 2/20; H01M 2/202; H01M 2/1011; H01M 2/00; H01M 10/20; H01M 10/48; H01M 10/4257
  USPC .......... 361/807, 748; 439/500, 507, 627, 152, 439/158, 160, 61
  See application file for complete search history.

(56) References Cited

U.S. PATENT DOCUMENTS

| | | | | |
|---|---|---|---|---|
| 6,152,776 A | * | 11/2000 | Ikeda et al. | .............. 439/627 |
| 2006/0292419 A1 | | 12/2006 | Shen et al. | |
| 2009/0096418 A1 | * | 4/2009 | Abadia et al. | .............. 320/116 |

FOREIGN PATENT DOCUMENTS

| | | | |
|---|---|---|---|
| DE | 101 34 143 A1 | | 1/2003 |
| DE | 10134143 | * | 1/2003 |

(Continued)

OTHER PUBLICATIONS

International Search Report dated Dec. 7, 2010 issued in PCT/EP2010/004139.

(Continued)

*Primary Examiner* — Robert J Hoffberg
*Assistant Examiner* — Mukund G Patel
(74) *Attorney, Agent, or Firm* — Scully, Scott, Murphy & Presser, P.C.

(57) ABSTRACT

In order that even the cell connectors (17) of, for instance, a traction rechargeable battery (11) which carry very high currents can be connected to a battery management system (21) in a fault-resistant and functionally reliable manner, firstly a circuit board (24) in the form of a leadframe (25) encapsulated with plastic by injection molding is latched onto the housing (13) mechanically grouping the cells (12), said circuit board in any case not projecting higher than the adjacent end faces (15) of the cell terminal connections (14) projecting at a clear radial distance therefrom. When a cell connector (17) is placed onto the terminal connections (14), it descends with a nozzle (32) extending in a manner curved away therefrom into the plane of the leadframe (25) parallel to the cell connector (17), and in the process becomes wedged between at least two clamping lugs (35) facing one another, whereby an extremely reliable mechanical and electrical connection of the cell connector (17) to the wiring circuit board (24) is produced.

12 Claims, 2 Drawing Sheets

(56) References Cited

FOREIGN PATENT DOCUMENTS

Figure 1:
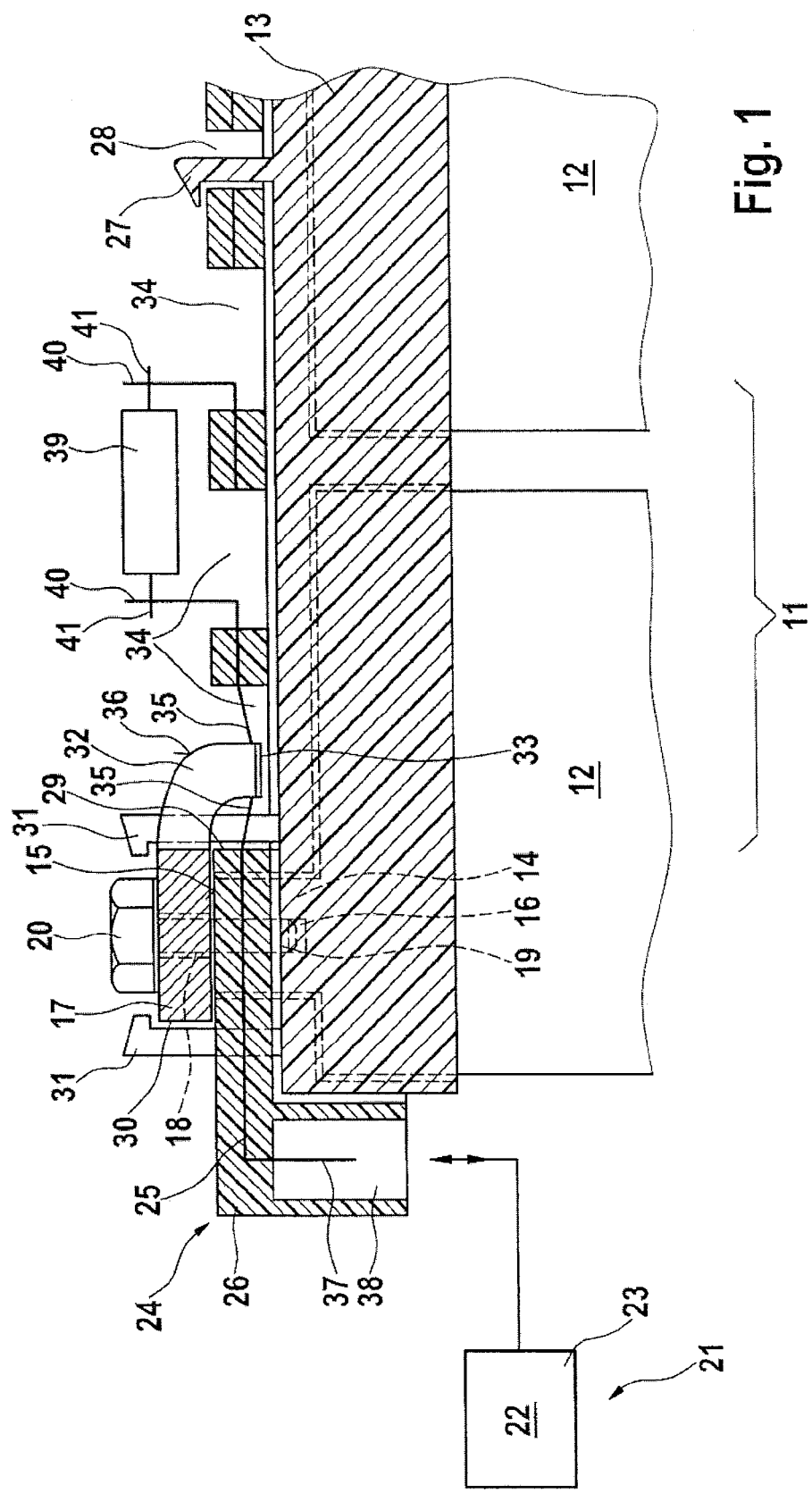

| | | |
|---|---|---|
| DE | 198 10 746 B4 | 10/2008 |
| GB | 2 330 252 A | 4/1999 |
| JP | 06-044600 A | 2/1994 |
| JP | 2009-087542 A | 4/2009 |
| WO | WO 2007/033689 A1 | 3/2007 |

OTHER PUBLICATIONS

Notification of Reason for Rejection dated Mar. 28, 2014, issued in Japanese Patent Application No. 2012-521994 (English translation only).

* cited by examiner

ARRANGEMENT FOR CONNECTING ELECTRICAL CONDUCTORS TO TERMINAL CONNECTIONS OF INTERCONNECTED CELLS

The invention relates to an arrangement in accordance with the preamble of the main claim.

A connection arrangement of this type is known from DE 1 98 10 746 B4 in the case of rechargeable batteries for electromotive traction. This arrangement consists there of a circuit board whose conductors in the case of circuit board holes are placed in a contact fashion onto the terminal connections of a plurality of cells, said terminal connections ending in one plane, before likewise perforated high-current cell connectors are placed thereabove, by means of which the cells are then interconnected to form the cell pack of the rechargeable battery. This two-layered arrangement composed of cell connector and circuit board clamped in underneath is fixed by means of screws which, in a manner engaging through the holes thereof, are screwed into internal threads of the terminal connections. The conductors formed on the circuit board lead from the terminal connections located along the edge of the circuit board to the central region of the circuit board, said central region being populated with a circuit for a battery management system, and to shunts for adjusting the charge states of the individual cells among one another and also to multiple plugs as data interfaces. Since the circuit board is thereby on the one hand screwed rigidly in each case between the solid cell connectors and the terminal connections with multiply over determined mounting, while on the other hand vibrations and temperature-dependent forces from the terminal connections act on the cell connectors via the circuit board in an operationally governed manner, a flexible material is chosen for the circuit board. However, that gives rise to the risk of fractures of the conductors precisely in direct proximity to the terminal screw joints and, consequently, the failure of the entire cell pack of such a traction rechargeable battery owing to the battery management system no longer being functional.

In recognition of these circumstances, the present invention is based on the technical problem of specifying a connection arrangement, for the battery management system, in particular, said connection arrangement being reliable independently of operation in conjunction with terminal connection technology that can be manipulated in a simple manner.

This object is achieved according to the present invention in accordance with the features of the main claim. Accordingly the circuit board is mechanically decoupled from the terminal connections and thus from the cells by virtue of the circuit board no longer being mechanically fixed to be the terminal connections but rather on a part of a rechargeable battery housing accommodating the cells. Then a cell connector, which initially is only positioned on the terminal connections and is to be screwed to the latter later, then without clamping in the circuit board, preferably with a here so-called nozzle running in a manner angled away from its plane (or alternatively with a rod integrally formed on it perpendicularly to its plane), engages in a contact-making manner compliantly into a leadframe structure—encapsulated by injection molding—of the circuit board fixed on the rechargeable battery housing.

For this purpose, at least two lugs cut free on the leadframe project slightly resiliently in a manner facing toward one another at their ends into a cutout in the plastic encapsulation. When the cell connector is pressed onto the terminal connections, the nozzle angled away from the plane of the cell connector sinks into the cutout and therein between the end edges of the lugs, which, as a result, bend out slightly in the descending direction and thus fixedly clamp the nozzle, in a manner secured against sliding back in a force-locking fashion. As a result, the cell connector is premounted for the final screw connection on its terminal connections and is at the same time already connected to the electrical conductor structure of the leadframe.

Expediently, further lugs cut free on the leadframe, projecting by their ends through openings in the encapsulation, are bent out from the plane of the leadframe, such that components such as measuring resistors for the battery management system and, in particular, charge balancing resistors can be connected to said lugs, and thus to the conductor structure of the circuit board in the form of the leadframe encapsulated by injection molding. The required conductor cross sections, which are large for said components in comparison with simple measurement data paths, can be made available in a straightforward manner and less problematically than in the case of laminated conductors, by means of correspondingly adapted widths of the leadframe tracks of corresponding thickness. If very acute-angled incisions which open in a v-shaped manner, for instance, are stamped into the ends of such connection lugs, then it is possible, in a simple manner in terms of handling technology, to directly clamp in the connections of the resistors and of other components here, for solder-free placement in the direction of the engagement of the nozzle into the leadframe and, consequently, against the rechargeable battery housing supporting the circuit board.

Other ends of leadframe lugs can be stamped such that they end narrowly in filigree fashion in order, prior to the formation of a plug receptacle in the course of the encapsulation by injection molding of the leadframe with its plastic encapsulation, to be bent out for instance from the plane of the leadframe directly to form plug pins. As a result, it is no longer necessary to mount individual plugs for data interfaces separately onto the circuit board.

In the context of the present invention, the circuit board does not have to be arranged below the terminal connectors; the nozzles can perfectly well also project up from their respective terminal connector for engagement into a circuit board located thereabove. More expedient, however, is the large-area bearing of the leadframe circuit board—flat at the back—on the rechargeable battery housing respectively at a radial distance from the terminal connections onto which the cell connectors which engage locally into the leadframe of the circuit board by means of their nozzles are then screwed, without the leadframe encapsulation being plugged in mechanically in this case.

Figure 2:
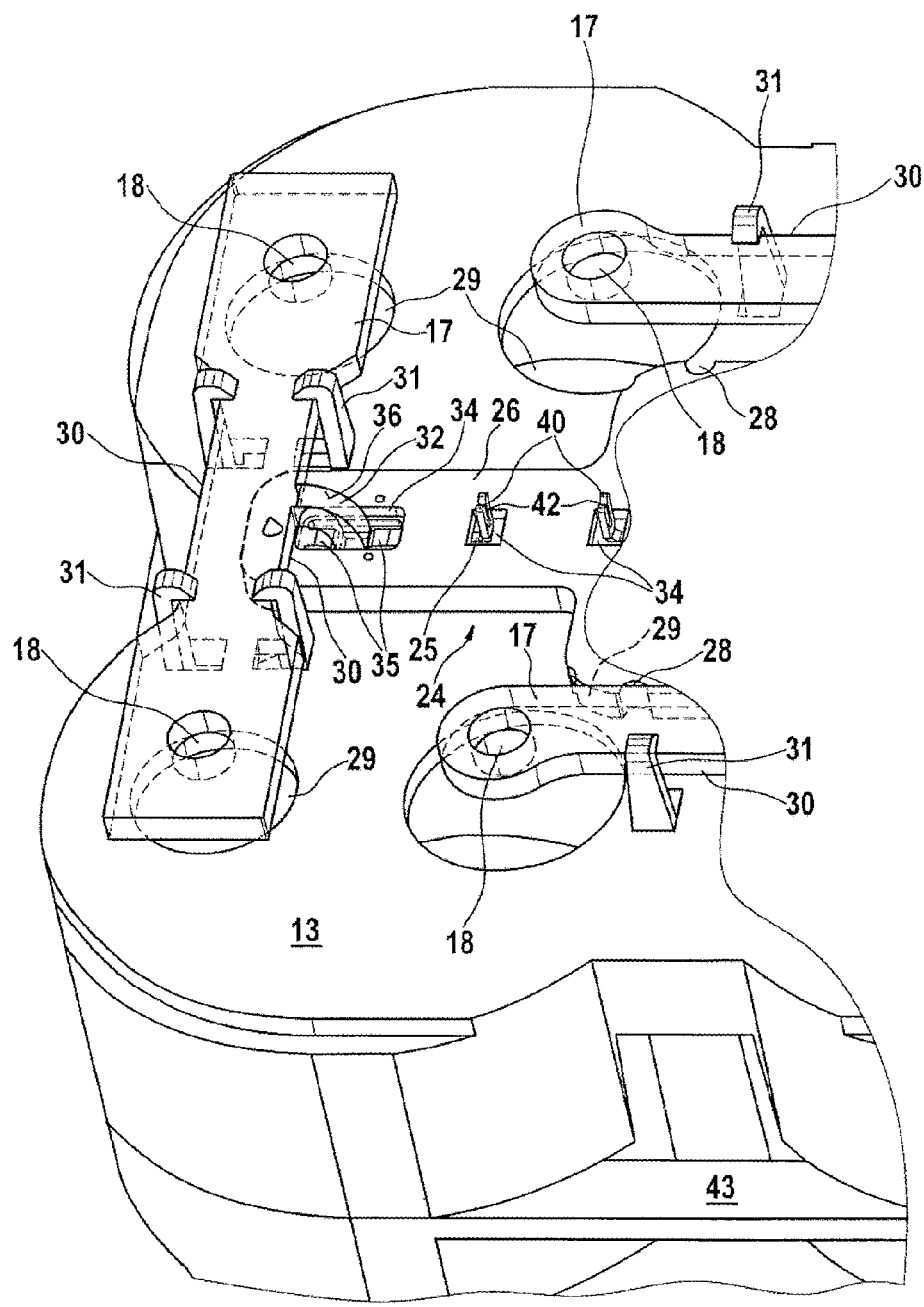

Additional alternatives and developments of the solution according to the invention are evident from the further claims and, also taking account of the advantages thereof, from the following description of a preferred exemplary realization of the invention which is depicted schematically in an enlarged fashion in a manner not wholly true to scale, and in a manner restricted to the functionally essential aspects. The drawing illustrates a connection arrangement according to the invention with the engagement of a cell connector by way of a nozzle thereof into the leadframe of the circuit board, said leadframe being encapsulated by injection molding, FIG. 1 in truncated cross-sectional illustration and FIG. 2 in truncated oblique view toward a housing equipped on the circuit board side, without the cells.

A rechargeable battery 11 serving for traction purposes, for instance, constitutes an interconnection of a plurality of cells 12 mutually connected in series and/or in parallel. For this purpose, the cells 12 are mounted in a correspondingly profiled housing 13 (cf. FIG. 2) which is produced in a hoodshaped manner by plastic injection molding, for example, and from which they project with their two cylindrical terminal connections 14. Blind holes 16 provided with internal threads open into the free end faces 15 of the two terminal connections 14 of each cell 12, said end faces lying in one plane. The cells 12 are interconnected in a manner taking account of polarity by means of solid strip-shaped high-current cell connectors 17, which are positioned for this purpose in each case with a through-hole 18 above a blind hole 16. Thus, the cell connector 17 can be fixedly connected to assigned terminal connections 14 by means of threaded bolts 19 of screws 20 which reach through the through-holes 18 of said cell connector and engage into the blind holes 16.

For a battery management system 21, which, in the interests of the service life and performance of the cells 12, controls the charging and discharging cycles thereof and regulates charge balancing of the cells 12 among one another, the individual cell connectors 17 are intended to be connected to corresponding components 22 and circuits 23 by means of electrical conductors operationally reliably in a mounting process which, in terms of handling technology, is as simple as possible and as free as possible from errors. That is realized by means of a circuit board 24 consisting of a leadframe 25 which, prior to the final separation of stabilization bridges used for handling purposes, by plastic injection molding, is provided with a substantially flat but relatively stiff encapsulation 26 having a high mechanical loading capacity. The actual electrically active conductor course then arises in a manner known per se when the stabilization bridges are stamped out through openings cut out in the encapsulation 26.

Said circuit board 24 is positioned and fixed in a manner bearing flat on the housing 13 by means of a plurality of latching hooks 27 which are arranged at a distance from one another and which are preferably integrally injection-molded onto the housing 13 and engage over the circuit board 24, through positioning holes 28 cut out for this purpose or along its outer edge. Moreover, the circuit board 24 is designed with boundaries (or perforations) 29 running in such a way that it does not touch the lateral surfaces of the terminal connections 14, that is to say maintains radially clear spacing from the latter.

At any case in the region of the course of cell connectors 17, the circuit board 24 bearing on the housing 13 projects to a slightly lesser extent, in any case not to a greater extent, than the clear height of the terminal connections 14. When a cell connector 17 is placed on the end faces 15 thereof and braced against them by means of the screws 20, this does not therefore result in sandwich-like clamping-in of the circuit board 24 mounted underneath onto the housing 13. Such circuit board is and remains connected in a relatively soft fashion and therefore mechanically gently by means of the latching hooks 27 to its large-area support in the form of the housing 13.

Before the screw connection of a cell connector 17 placed onto the terminal connection end faces, said cell connector is prepositioned by means of latches 31 engaging over its longitudinal edges 30, which latches, like the latching hooks 27, are integrally molded onto the housing 13 but reach through the circuit board 24 with radial play.

The contour of the cell connector 17 is formed with at least one lateral projection, preferably by stamping, which is bent to form a nozzle 32 which, with its end 33 remote from the actual cell connector 17, finally faces, out of the plane of the cell connectors 17, in a direction transversely with respect to the plane of the cell connector and toward the circuit board 24. When pressed into the latches 31, this end 33 therefore descends into the plane of the leadframe 25, namely into a cutout 34 in the encapsulation 26 thereof. At least two clamping lugs 35 stamped free on the leadframe 25 protrude into said cutout 34 in a manner facing toward one another at a distance. They are bent slightly elastically away from one another in the insertion direction by the end 33 of the nozzle 32, as outlined schematically, and thereby become wedged at the lateral surfaces 36 of the nozzle 32.

The nozzle 32 engaging into the leadframe 25 in the course of the premounting of the cell connector 17 thus constitutes a desirably elastically compliant but at the same time highly vibration-resistant, mechanical as well as electrical connection of the cell connector 17, screwed on mutually adjacent terminal connections 14, to the wiring in the form of the leadframe 25.

Alternatively, a rod is integrally formed on the underside of the cell connector 17, and—analogously to the nozzle 32—engages into the leadframe 25.

A data interface required for the connection of an external circuit 23 is expediently likewise integrated into the leadframe 25 by virtue of the fact that leadframe ends designed in a particularly narrow fashion, then serving as plug pins 37, are surrounded by an injection-molded plug receptacle 38 in the course of the encapsulation of the leadframe 25 by injection molding. Expediently, the plug pins 37, as depicted schematically, are bent out of the plane of the circuit board 24 with the aim that here a plug connection can be accomplished in the course of the latching of the circuit board 24 onto the housing 13. Contrary to the basic illustration in FIG. 1, a particularly compact construction results if the plug receptacle 38 is placed into one of the axially parallel housing interstices 43 (cf. FIG. 2), between mutually adjacent cells 12.

Current-dictated larger conductor cross sections for the connection of, for instance, resistors 39 for cell charge balancing are expediently realized within the leadframe 25 by means of correspondingly widened tracks. One particular advantageous placement possibility results from the fact that in circuit board cutouts 34 beyond the cell connectors 17 stamped-free track ends equipped here with narrow v-incisions 42 (cf. FIG. 2) at the ends are bent out of the plane of the circuit board 24 counter to the descending direction of the nozzle 32 to form placement clamps 40. The connections 41 of the components then only need be pressed into them in the direction of the circuit board mounting, that is to say toward the stabilizing base of the housing 13, and thereby be clamped for soldering-free placement.

Thus, all, mechanical and also electrical, mounting processes are effected in the same orientation: firstly the latching of the leadframe circuit board 24 on the rechargeable battery housing 13 together with plugging process in the receptacle 38, then the pressing of the cell connector nozzle 32 into and the pressing of the component connections 41 onto the leadframe 25.

In order that even the cell connectors 17 of, for instance, a traction rechargeable battery 11 which carry very high currents can be connected to, for instance, a battery management system 21 in a fault-resistant and functionally reliable manner, according to the invention, therefore, firstly a circuit board 24 in the form of a leadframe 25 encapsulated with plastic by injection molding is latched onto the housing 13 mechanically grouping the cells 12, the encapsulation 26 of said circuit board in the vicinity of the cell connectors 17 in any case not projecting higher than the end faces 15 of the cell terminal connections 14 projecting therefrom at a clear distance from the encapsulation 26. When a cell connector 17 is premounted onto terminal connections 14, it descends with a nozzle 32 extending in a manner curved away therefrom, into the plane of the leadframe 25, and in the process becomes wedged between at least two clamping lugs 35 facing one another, whereby the reliable mechanical and electrical connection of the cell connector 17 to the leadframe 25 of the wiring circuit board 24 is produced with a single mounting direction.

LIST OF REFERENCE SYMBOLS

11 Rechargeable battery (composed of 12-12)
12 Cell (mounted in 13)
13 Housing (of 11)
14 Terminal connection (of 12)
15 End face (of 14)
16 Blind hole (in 14)
17 Cell connector (via 14-14)
18 Through-hole (in 17 via 16)
19 Threaded bolt (in 16)
20 Screw (comprising, 19)
21 Battery management system (for 12-12)
22 Component (in 23)
23 (External) circuit (at 38)
24 Circuit board (composed of 25-26)
25 Leadframe (in 26)
26 Encapsulation (of 25)
27 Latching hook (at 13 for 24)
28 Positioning hole (at 24 for 27)
29 Boundary/perforation (at/in 24, at a distance from 14)
30 Longitudinal edge (of 17)
31 Latch (between 13 and 17)
32 Nozzle (on 17, between 35-35)
33 End (of 32)
34 Cutout (in 24)
35 Clamping lugs (against 32)
36 Lateral surface (of 32)
37 Plug pin (in 38)
38 Plug receptacle (around 37)
39 Resistor (on 40)
40 Placement clamp (for 39)
41 Connection (of 39)
42 Incision (in 40 for 41)
43 Interstice (on the outside of 13, for 38)

The invention claimed is:

1. An arrangement for connecting a leadframe of a circuit board to terminal connections of cells interconnected by means of cell connectors, comprising:
the circuit board mounted at a clear distance from the terminal connections, wherein the circuit board comprises the leadframe, encapsulated by an encapsulation by injection molding, the leadframe, includes a conductor track structure, wherein the cell connectors have a plurality of lateral projections, the lateral projections being formed to provide the nozzles or rods,
wherein each of the nozzles or rods engage within the leadframe between clamping lugs facing one another in a respective cutout in the encapsulation of the leadframe, such that an elastically compliant and highly vibration-proof mechanical and electrical connection of the cell connectors to the conductor track structure of the leadframe is provided.

2. The arrangement as claimed in claim 1, wherein the nozzles projecting from the cell connectors extend in a direction transversely with respect to the plane of the cell connectors.

3. The arrangement as claimed in claim 1, wherein the encapsulation, in the vicinity of cell connectors, does not project higher than the terminal connections.

4. The arrangement as claimed in claim 1, wherein the encapsulation is latched on a housing for grouping of the cells.

5. The arrangement as claimed in claim 4, wherein latching hooks, protruding from the housing in a direction opposite the insertion direction of the nozzles, penetrate through the encapsulation at positioning holes.

6. The arrangement as claimed in claim 4, wherein the cell connectors are also latched to the housing.

7. The arrangement as claimed in claim 6, wherein the cell connectors are connected to the cells by means of screws engaging into blind holes in the terminal connections of said cells, without axial stressing of the leadframe encapsulation.

8. The arrangement as claimed in claim 4, wherein the placement of the leadframe encapsulation on the housing is oriented in the same direction as the plugging direction of a plug receptacle and the mounting direction of the cell connector together with the pressing-in direction of the nozzle thereof and also the placement direction of resistors on the circuit board.

9. The arrangement as claimed in claim 1, wherein a plug receptacle is integrally formed onto the encapsulation, plug pins stamped free at the leadframe ending in said plug receptacle.

10. The arrangement as claimed in claim 9, wherein the plug pins are oriented in the same plugging direction as the nozzles.

11. The arrangement as claimed in claim 1, wherein placement clamps stamped free from the leadframe are bent out from the plane of the leadframe through encapsulation cutouts.

12. The arrangement as claimed in claim 11, wherein narrow notches that open in a V-shaped fashion are stamped free for soldering-free mounting of component connections in the ends of the placement clamps.

* * * * *